(12) United States Patent
Exner et al.

(10) Patent No.: US 12,223,726 B2
(45) Date of Patent: Feb. 11, 2025

(54) ELECTRONIC DEVICE AND RELATED METHODS FOR MONITORING OBJECTS

(71) Applicant: Sony Group Corporation, Tokyo (JP)

(72) Inventors: Peter Exner, Basingstoke (GB); Hannes Bergkvist, Basingstoke (GB); Anders Isberg, Basingstoke (GB); Peter Blomqvist, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 19 days.

(21) Appl. No.: 17/693,642

(22) Filed: Mar. 14, 2022

(65) Prior Publication Data

US 2022/0319180 A1 Oct. 6, 2022

(30) Foreign Application Priority Data

Mar. 30, 2021 (SE) .................... 2150390-9

(51) Int. Cl.
*G06V 20/52* (2022.01)
*G06T 7/40* (2017.01)
*G06V 10/22* (2022.01)
*G06V 40/10* (2022.01)
*G08B 21/18* (2006.01)

(52) U.S. Cl.
CPC .............. *G06V 20/52* (2022.01); *G06T 7/40* (2013.01); *G06V 10/225* (2022.01); *G06V 40/10* (2022.01); *G08B 21/18* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 8,374,423 B2 | 2/2013 | Lee et al. | |
| 9,384,407 B2* | 7/2016 | Wang | G06F 18/22 |
| 9,489,820 B1* | 11/2016 | Kusens | G08B 21/0476 |
| 9,519,969 B1* | 12/2016 | Kusens | G08B 21/0476 |
| 9,524,443 B1* | 12/2016 | Kusens | G06V 10/143 |
| 9,892,611 B1* | 2/2018 | Kusens | G06T 7/246 |
| 10,671,843 B2* | 6/2020 | Varadarajan | G06V 40/107 |
| 10,740,847 B1* | 8/2020 | Devereaux | G06Q 40/03 |
| 10,877,605 B2 | 12/2020 | Kurz | |

(Continued)

FOREIGN PATENT DOCUMENTS

| | | |
|---|---|---|
| CN | 110603533 A | 12/2019 |
| CN | 112450120 A | 3/2021 |
| GB | 2507644 A | 5/2014 |

OTHER PUBLICATIONS

Office Action and Search Report from corresponding Swedish Application No. 2150390-9, mailed on Nov. 15, 2021, 8 pages.

(Continued)

*Primary Examiner* — Reza Aghevli
(74) *Attorney, Agent, or Firm* — Tucker Ellis LLP

(57) ABSTRACT

An electronic device configured to monitor an object. The electronic device is configured to generate a first area indicative of a person, generate a second area indicative of an object, determine, based on the first area and the second area, an interaction parameter indicative of an interaction between the person and the object, determine, based on the interaction parameter, a status indicator of the object, generate a maintenance indicator based on the status indicator, and output the maintenance indicator.

20 Claims, 4 Drawing Sheets

(56) References Cited

U.S. PATENT DOCUMENTS

| | | | |
|---|---|---|---|
| 11,587,361 B2* | 2/2023 | Radwin | G06V 40/28 |
| 2009/0141939 A1* | 6/2009 | Chambers | G08B 13/19613 |
| | | | 382/103 |
| 2011/0085709 A1 | 4/2011 | Watanabe et al. | |
| 2013/0136298 A1* | 5/2013 | Yu | G06T 7/70 |
| | | | 382/103 |
| 2014/0002647 A1 | 1/2014 | Xu et al. | |
| 2014/0211019 A1* | 7/2014 | Choi | G06V 20/52 |
| | | | 348/159 |
| 2014/0244344 A1* | 8/2014 | Bilet | G16Z 99/00 |
| | | | 705/7.28 |
| 2014/0347479 A1* | 11/2014 | Givon | G06V 40/103 |
| | | | 382/116 |
| 2015/0288928 A1* | 10/2015 | McCoy | H04N 5/44 |
| | | | 348/143 |
| 2015/0336013 A1* | 11/2015 | Stenzler | G06V 10/245 |
| | | | 700/90 |
| 2015/0336014 A1* | 11/2015 | Stenzler | G01J 1/0295 |
| | | | 472/137 |
| 2015/0338196 A1* | 11/2015 | Cortelyou | F42B 4/00 |
| | | | 102/335 |
| 2015/0338548 A1* | 11/2015 | Cortelyou | G01N 21/8422 |
| | | | 250/214.1 |
| 2015/0339920 A1* | 11/2015 | Cortelyou | G06V 20/52 |
| | | | 340/907 |
| 2016/0247101 A1* | 8/2016 | Agrawal | B64D 47/08 |
| 2016/0313442 A1 | 10/2016 | Ho | |
| 2017/0270689 A1* | 9/2017 | Messely | H04N 7/183 |
| 2017/0323540 A1* | 11/2017 | Boykin | H04N 1/00 |
| 2018/0050800 A1* | 2/2018 | Boykin | H04N 21/2368 |
| 2018/0144605 A1* | 5/2018 | Kusens | A61B 5/1115 |
| 2018/0150685 A1 | 5/2018 | Ebrom et al. | |
| 2018/0211104 A1 | 7/2018 | Zhao et al. | |
| 2018/0285634 A1* | 10/2018 | Varadarajan | G06V 40/107 |
| 2019/0325230 A1* | 10/2019 | Nadler | G06T 19/20 |
| 2020/0193166 A1 | 6/2020 | Russo et al. | |
| 2020/0349347 A1* | 11/2020 | Morzhakov | G06V 20/52 |
| 2021/0004606 A1* | 1/2021 | Se | G06V 20/52 |
| 2021/0049353 A1* | 2/2021 | Bian | G06V 40/23 |
| 2021/0150869 A1* | 5/2021 | Deutsch | G08B 13/248 |
| 2021/0192258 A1* | 6/2021 | Sabripour | G08B 13/19608 |
| 2021/0390712 A1* | 12/2021 | Shimizu | G06V 10/82 |
| 2022/0004949 A1* | 1/2022 | Goncharov | G06V 20/52 |
| 2022/0019759 A1* | 1/2022 | Goyal | B64D 47/04 |

OTHER PUBLICATIONS

Michalis Vrigkas et al., "A Review of Human Activity Recognition Methods", Frontiers in Robotics and AI, vol. 2, Article 28, Nov. 16, 2015, pp. 1-28.

* cited by examiner

ELECTRONIC DEVICE AND RELATED METHODS FOR MONITORING OBJECTS

CROSS REFERENCE TO RELATED APPLICATIONS

The present application claims priority to Swedish Patent Application No. 2150390-9, filed Mar. 30, 2021, the content of which is incorporated herein by reference in its entirety.

TECHNICAL FIELD

The present disclosure pertains generally to the field of Internet-of-Things (IoT) and monitoring thereof, and more specifically to the monitoring of non-Internet-of-Things (non-IoT) objects. The present disclosure relates to an electronic device and related methods.

BACKGROUND

Lightweight communication has enabled a myriad of objects to be connected to a network and/or a server, allowing for reporting measurements and status of the objects for analysis and monitoring.

However, there are a number of important everyday objects which may be essential for the efficient flow of day to day office tasks, hindered by not having communication capabilities, also known as non-IoT objects. As an example, office equipment such as chairs, pens and remote controls experience frequent daily usage, but usually have no means of reporting in usage patterns or malfunction.

A common solution is to periodically check the status of the objects with respect to functionality only. However, in large office environments with thousands of objects, this additional attention adds extra strain on maintenance staff.

Further, during an outbreak, office objects introduce an additional risk for transmission of afflictions or diseases. A common protocol for decontamination requires complete disinfection of all objects within a space. However, studies have shown that viral lifetime depends on surface material, requiring extra attention to be given to certain objects during a clean-up.

There is a need for efficiently monitoring non-IoT objects to report not only malfunction and cleaning needs, but also assist in creating efficient office workflows and assist during maintenance.

SUMMARY

Accordingly, there is a need for electronic devices and related methods which may mitigate, alleviate or address the existing shortcomings, and may provide improved monitoring capabilities of non-IoT objects and/or IoT objects.

An electronic device is disclosed. The electronic device can be configured to monitor an object. The electronic device can comprise memory circuitry. The electronic device can comprise interface circuitry. The electronic device can comprise processor circuitry. The processor circuitry can be configured to generate, based on image data comprising one or more frames indicative of a person and/or the object, a first area indicative of the person. The processor circuitry can be configured to generate, based on the image data, a second area indicative of the object. The processor circuitry can be configured to determine, based on the first area and the second area, an interaction parameter indicative of an interaction between the person and the object. The processor circuitry can be configured to determine, based on the interaction parameter, a status indicator of the object. The processor circuitry can be configured to generate a maintenance indicator based on the status indicator. The processor circuitry can be configured to output the maintenance indicator.

Disclosed is a method. The method can be performed by an electronic device to monitor an object. The method can include generating, based on image data including one or more frames indicative of a person and/or the object, a first area indicative of the person. The method can include generating, based on the image data, a second area indicative of the object. The method can include determining, based on the first area and the second area, an interaction parameter indicative of an interaction between the person and the object. The method can include determining, based on the interaction parameter, a status indicator of the object. The method can include generating a maintenance indicator based on the status indicator. The method can include outputting the maintenance indicator.

It is an advantage of the present disclosure that non-IoT objects can be monitored for their particular status, such as usage and/or health of the object. Advantageously, the disclosed devices and methods can improve maintenance, such as cleaning and/or repair, of the non-IoT objects. This can be particularly advantageous for locations with a large number of non-IoT objects, where it would require significant time and effort to clean and maintain all of the objects without targeted approaches such as disclosed herein. Maintenance activities, and associated materials, can be efficiently targeted accordingly to the disclosure, and unused objects can properly receive for example less attention for cleaning and/or for example more attention for repair. Further, office layout and workflows can be improved, such as via status indicators indicative of movement of objects.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
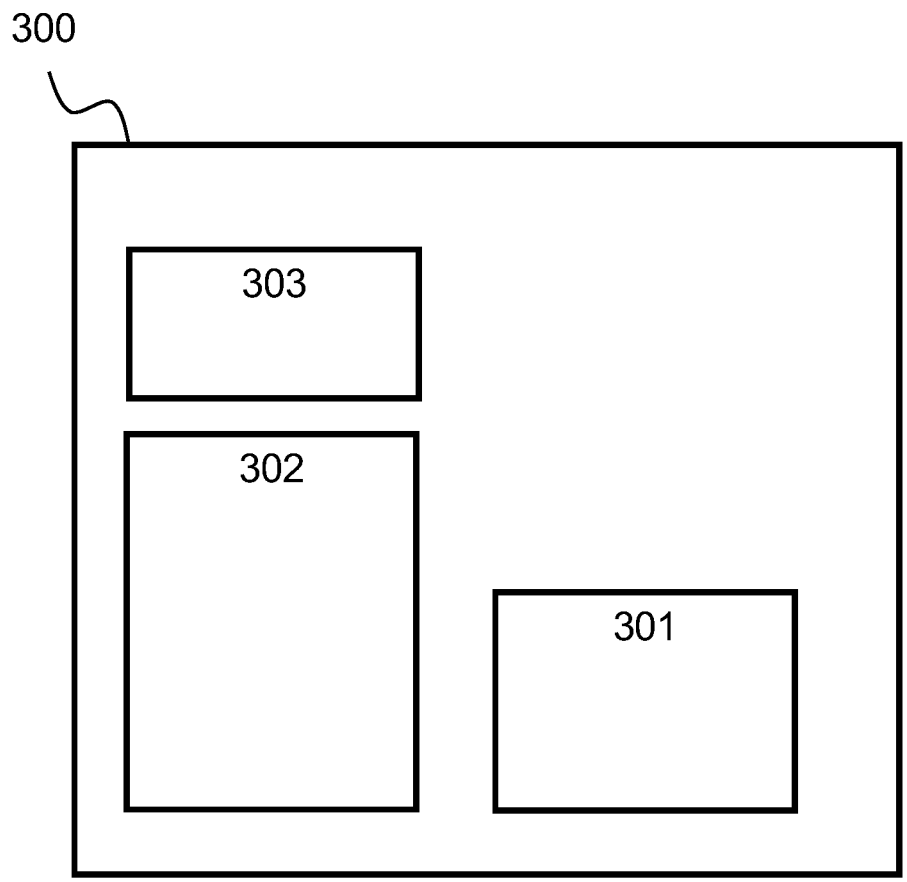
FIG. 1 is a block diagram illustrating an example electronic device according to the disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

Disclosed herein are devices, systems, assemblies, and/or methods for monitoring one or more objects, also known as items, things, devices, equipment, articles, and/or bodies. The objects may be non-IoT objects. The objects can be the same type of object. The objects can be different types of objects. The particular object is not limiting. For example, one or more objects can be monitored for indications that the objects should be cleaned, repaired, removed, moved, etc. It may be envisaged that some objects may be Internet-of-Things (IoT) objects in some examples.

In one or more example electronic devices, the electronic device can be configured to monitor one or more objects for maintenance and/or repair of a malfunctioning of the object. The electronic device can be configured to monitor and/or generate a status indicator of an object, and may report the status indicator of the object. The electronic device can be configured to monitor and/or generate a maintenance indicator of an object, and may report the maintenance indicator of the object, for example to an external device and/or to a person. A person, such as a maintenance person, can be notified to maintain the object.

One or more example electronic devices enable analysis of objects by monitoring human interaction and/or non-interaction with objects. The monitoring can be performed through the use sensors, such as via image processing.

The objects to be monitored may be non-IoT objects. In particular, as non-IoT objects are not connected to a network, the objects may not be efficiently monitored by an electronic device. This can include IoT objects that are disconnected from a particular network, such as when the object is turned off. A disconnected IoT object can be considered a non-IoT object for purposes of the disclosure.

As discuss herein, the objects may be office supplies and/or equipment. However, the electronic device and associated methods may be used for other types of objects, such as farm equipment, household equipment and/or supplies, factory equipment and/or supplies, and the particular objects are not limiting.

The electronic device disclosed herein can be one of many types of electronic devices. The electronic device can be a server, such as a cloud server. The electronic device can comprise an image sensor, such as a camera. The electronic device can be camera, such as a smart camera. The electronic device can be computer. The electronic device can be a user device.

The electronic device can be part of a system and/or assembly of devices. The electronic device can be more than one electronic devices. The electronic device can be configured to connect to one or more other devices. The electronic device can be configured to connect to a server. The electronic device can be configured to connect to an image sensor. The electronic device can be configured to connect to a user equipment. The connections can be wired and/or wireless connections. The electronic device can be configured to run a program. For example, the electronic device can be a phone running an application.

FIG. 1 shows a block diagram of an example electronic device 300 according to the disclosure. The electronic device 300 may be configured to monitor an object, such as one or more objects, such as one or more non-IoT objects. The electronic device 300 may be configured to monitor a person, such as one or more persons, such as one or more people. The electronic device 300 may be configured to monitor interactions and/or non-interactions between object(s) and person(s). The electronic device 300 can comprise memory circuitry 301. The electronic device 300 can comprise processor circuitry 302. The electronic device 300 can comprise an interface circuitry 303.

The electronic device 300 can be configured to monitor a space, such as one or more of a room, conference room, meeting room, home, office, factory, area, inside space, and outside space. The particular monitoring location to be monitored by the electronic device 300 is not limiting.

In one or more example electronic devices, the processor circuitry 302 can be configured to generate a first area indicative of a person. In one or more example electronic devices, the processor circuitry 302 can be configured to generate, based on image data comprising one or more frames indicative of a person and/or the object, a first area indicative of the person. In one or more example electronic devices, the processor circuitry 302 can be configured to generate a second area indicative of the object. In one or more example electronic devices, the processor circuitry 302 can be configured to generate, based on the image data, a second area indicative of the object. In one or more example electronic devices, the processor circuitry 302 can be configured to determine an interaction parameter indicative of an interaction between the person and the object. In one or more example electronic devices, the processor circuitry 302 can be configured to determine, based on the first area and the second area, an interaction parameter indicative of an interaction between the person and the object. In one or more example electronic devices, the processor circuitry 302 can be configured to determine a status indicator of the object. In one or more example electronic devices, the processor circuitry 302 can be configured to determine, based on the interaction parameter, a status indicator of the object. In one or more example electronic devices, the processor circuitry 302 can be configured to generate a maintenance indicator based on the status indicator. In one or more example electronic devices, the processor circuitry 302 can be configured to output the maintenance indicator.

In one or more example electronic devices, the processor circuitry 302 can be configured to generate a first area indicative of a person and/or a second area indicative of an object, such as a non-IoT object. The area(s), such as the first area and/or the second area, can be any shape, such as square, rectangle, circle, polygonal, and the particular shape does not limit the disclosure. The area(s), such as the first area and/or the second area, are bounding box(es) in some examples. The area(s), such as the first area and/or the second area, can be saved in the memory circuitry 301.

The area(s), such as the first area and/or the second area, can be two-dimensional. The area(s), such as the first area and/or the second area, can be three-dimensional.

The area(s), such as the first area and/or the second area, can approximate the shape of the object they are indicative of, such as the person and the object respectively. The area(s), such as the first area and/or the second area, can be the same shape as the object they are indicative of, such as the person and the object respectively.

The area(s), such as the first area and/or the second area, may be indicative of a portion of the object they are indicative of, such as the person and the object respectively. The area(s), such as the first area and/or the second area, may be indicative of an entirety of the object they are indicative of, such as the person and the object respectively.

For example, the first area indicative of the person may be indicative of a body part of the person, such as one or more body parts of the person. A body part may be seen as a part of the person's body, such as a hand, a foot, a face, an arm, a leg, an upper body, and/or a lower body. The determination, based on the first area and the second area, of an interaction parameter indicative of the interaction between the person and the object may comprise a determination, based on the first area and the second area, of an interaction parameter indicative of an interaction between a body part of the person and the object.

The area(s), such as the first area and/or the second area, can be variable in dimensions. The area(s), such as the first area and/or the second area, can be static in dimensions. The processor circuitry 302 may be configured to change the area(s), such as the first area and/or the second area.

In one or more example electronic devices, the processor circuitry 302 can be configured to generate third, fourth, fifth, etc. areas indicative of second, third, fourth, and fifth person. The particular number of areas to be generated is not limiting.

In one or more example electronic devices, the processor circuitry 302 can be configured to generate third, fourth, fifth, etc. areas indicative of second, third, fourth, and fifth objects. The particular number of areas to be generated is not limiting.

In one or more example electronic devices, the electronic device 300 can receive image data. The image data may include one or more frames. The image data can be received from an image sensor, such as a camera. The image sensor can be an optical sensor. The image sensor can be a depth camera. The image sensor can be a thermal camera. The image sensor can be configured for indoor monitoring. The image sensor can be configured for outdoor monitoring. The image data can be received from a plurality of image sensors. The image sensor may be part of the electronic device 300. The image sensor may not be part of the electronic device 300.

The image sensor may be a smart camera. In one or more example electronic devices, the smart camera may perform one or more of the steps of the processor circuitry 302 for privacy concerns. In one or more example electronic devices, the smart camera may perform all of the steps of the processor circuitry 302 for privacy concerns.

The image data may be received at specific times. For example, the image data can be received after a particular room is used, thereby having a delay from real-time. The image data may be received in real-time. The image data may be received wirelessly. The image data may be received via a wired connection.

The processor circuitry 302 can be configured to determine an interaction parameter. The processor circuitry 302 can be configured to determine an interaction parameter based on the first area and the second area. The interaction parameter can be indicative of an interaction between the person and the object, such as between a body part of the person and the object. The interaction parameter may be determined based on an intersection or contact between the first area with the second area. A new interaction parameter can be determined for every interaction. An interaction parameter may be updated for every interaction. The interaction parameter may include a duration of interaction. The interaction parameter may include a frequency of interaction. The interaction parameter may include location information. The interaction parameter may include motion information.

The processor circuitry 302 can be configured to determine a status indicator of the object. For example, the processor circuitry 302 can be configured to determine, based on the interaction parameter, a status indicator of the object. The status indicator may indicate the status of the object, such as the state of the object, such as a maintenance state of the object. In other words, the status indicator may be seen as an indicator of a state of the object for maintenance, such as cleaning, and/or repair and/or redesign of space layout. The status indicator may be a counter. For example, the status indicator may count every interaction parameter received. The counter may count up. The counter may count down.

The status indicator may be indicative of object usage. The status indicator may be indicative of object health status.

The processor circuitry 302 can be configured to generate a maintenance indicator based on the status indicator. For example, once the status indicator meets a certain threshold, a maintenance indicator may be generated by the processor circuitry 302.

The maintenance indicator may be a general maintenance indicator for any object. For example, the maintenance indicator may indicate that a particular object requires cleaning, repair or exchange. The maintenance indicator may be tied to a particular object and/or type of object. The maintenance indicator may include data such as usage and status data. For example, the maintenance indicator may include data indicative of the interaction parameter and/or the status indicator.

For example, a chair may have a different maintenance indicator than a pen. All chairs may have the same maintenance indicator. Different chairs may have different maintenance indicators.

For example, if the chair has been determined to be moved, and then no further interaction parameter is determined, a maintenance indicator for the chair may be generated and/or updated to trigger maintenance. For example, the chair is moved and thereafter not used, a maintenance indicator indicative of a need for maintenance or repair of the chair may be generated. Accordingly, the chair may be removed as it is not being often used, and may present a defect and be in the way.

In one or more examples, if a pen has a high number of interaction parameters, the pen may receive a maintenance indicator. This may be indicative that the pen is not working, as it is picked up and put down many times.

In one or more examples, if a pen has a high number of interaction parameters and each of the interaction parameters has a duration below a threshold (such as short interactions), the pen may receive a maintenance indicator. This may be indicative that the pen is not working, as it is picked up and put down many times. The maintenance indicator may be indicative of an action that needs to be taken with respect to the object.

The maintenance indicator may be a general maintenance indicator that does not specify what action should be taken. The maintenance indicator may be a specific maintenance indicator that specifies what action should be taken. Example actions include one or more of moving the object, repairing/fixing the object, removing the object, cleaning the object, and replacing the object.

The processor circuitry 302 can be configured to output the maintenance indicator. The maintenance indicator can be output to an external device, such as a server. The maintenance indicator can be output to a network, such as a cloud. The maintenance indicator can be output to a database. The maintenance indicator can be output to a user device. The maintenance indicator can be for use by a user. The maintenance indicator can be output for further analysis and decision making.

In one or more example electronic devices, the electronic device 300 can be configured to obtain the image data. In one or more example electronic devices, the electronic device 300 can be configured to obtain, from an image sensor, the image data. The electronic device can be configured to obtain the data via wired or wireless connections to the image sensor.

In one or more example electronic devices, the electronic device 300 can include an image sensor internal to the electronic device 300 and/or external to the electronic device 300. In one or more example electronic devices, the electronic device 300 can include an image sensor internal to the electronic device 300. In one or more example electronic devices, the electronic device 300 can include an image sensor external to the electronic device 300.

In one or more example electronic devices, the generation of the first area can comprise applying a pose detection scheme to the one or more frames of the image data. The processor circuitry 302 can be configured to apply the pose detection scheme. For example, the processor circuitry 302 can be configured to apply the pose detection for generating the first area indicative of the person.

The processor circuitry 302 can be configured to apply a pose detection scheme to one or more frames of the image data, such as each frame. The processor circuitry 302 can be configured to extract, such as determined, choose, analyze, a body part segment from a human pose. The processor circuitry 302 can be configured to extract a plurality of body part segments. The processor circuitry 302 can be configured to extract, such as determined, choose, analyze, an object segment from an object, such as portion or an entirety of an object. The processor circuitry 302 can be configured to extract a plurality of object segments. In one or more example electronic devices, the processor circuitry 302 can be configured to apply a pose detection scheme on humans and/or objects, such as animate objects and/or inanimate objects. Inanimate objects can be, for example, boxes cars, and chairs. Animate objects can be, for example, farm animals.

For example, the body part segment may be one or more of a foot segment, a head segment, a body segment, a hand segment, a torso segment, a leg segment, and a finger segment. The body part segment may be part of the first area. The body part segment may be separate from the first area.

For example, in a room equipped with cameras for monitoring activity, a pose detection scheme may be applied on each frame to extract hand segment from human pose. This may allow to detect that for example a hand touches an object.

Advantageously, the use of body part segments may improve the effectiveness of the electronic device 300. Applying a pose detection can enable determining the interaction when the object is partially and/or fully obscured and/or occluded. For example, an object can be occluded by a person. For example a hand can be occluded by an object.

Applying a pose detection can enable determining the interaction when the second area is partially and/or fully obscured and/or occluded. Applying a pose detection can enable determining the interaction when the person or a body part of the person is partially and/or fully obscured and/or occluded. Applying a pose detection can enable determining the interaction when the first area is partially and/or fully obscured and/or occluded.

For example, a body part of a person, such as a hand, may be occluded by an object. The processor circuitry 302 can be configured to apply a pose detection scheme and estimate the size and/or direction of the person's hand to extract a body part segment indicative of the hand despite the occlusion.

As an example, the processor circuitry 302 can be configured to estimate and/or calculate a size of the occluded hand in relation to other body part segments of the person, such as a body part segment indicative of the upper and/or lower arm. The processor circuitry 302 can be configured to estimate and/or calculate a size of the occluded hand via analysis and comparison of the other hand of the person if not occluded. The processor circuitry 302 can be configured to analyze a direction of a body part segment indicative of the lower arm of the person and estimate, based on the direction, a direction of the occluded hand segment for extracting a body part segment indicative of the occluded hand.

The body part segment extraction may be performed in the image sensor, such as the camera. For example, this can allow for privacy of data. The body part segment extraction can be performed in a server.

If more than one person is monitored, the processor circuitry 302 can be configured to apply pose detection to each of the persons.

In one or more example electronic devices, the electronic device 300 can be configured to obtain, from a plurality of image sensors, the image data, for example to increase accuracy of status indicator, and/or a pose detection and/or a pose estimation.

In one or more example electronic devices, the generation of the second area can include applying an object extraction scheme to the one or more frames of the image data.

The processor circuitry 302 can be configured to apply an object detection scheme to one or more frames of the image data, such as each frame. The processor circuitry 302 can be configured to apply object extraction to the one or more frames, such as each frame, to extract information on non-IoT objects. The electronic device 300 can be configured to extract, such as determine, choose, analyze, a portion and/or all of the object.

The object extraction may be performed in the image sensor, such as the camera. For example, this can allow for privacy of data. The object extraction can be performed in a server.

If more than one object is monitored, the processor circuitry 302 can be configured to apply object extraction to each of the objects.

In one or more example electronic devices, the generation of the second area can include generating a bounding box. In one or more example electronic devices, the processor circuitry 302 can be configured to generate a bounding box. In one or more example electronic devices, the generation of the second area can include generating a bounding box indicative of the first area. In one or more example electronic devices, the generation of the second area can include generating, based on the object extraction scheme, a bounding box indicative of the first area.

The bounding box be indicative of dimensions of the object. The bounding box be indicative of the entire object. The bounding box can be indicative of a portion of the object. The bounding box may be any shape, such as a rectangle, square, triangle, and polygon, and the particular shape is not limiting.

If more than one object is monitored, the processor circuitry 302 can be configured to generate a bounding box for each of the objects.

In one or more example electronic devices, the status indicator can include one or more usage parameters. In one or more example electronic devices, the one or more usage parameters may include a duration of the interaction. In one or more example electronic devices, the one or more usage parameters may include a frequency of the interaction. In one or more example electronic devices, the one or more usage parameters may a movement of the object. In one or more example electronic devices, the one or more usage parameters may include a change of size of the second area. In one or more example electronic devices, the one or more usage parameters may include an effect by the object on another object. In one or more example electronic devices, the status indicator can include one or more usage parameters which can include a duration of the interaction and/or a frequency of the interaction and/or a movement of the object and/or a change of size of the second area and/or an effect by the object on another object.

For example, the electronic device 300 may monitor if and how often interaction has been made between the object, such as the second area, and the body part segment, such as the first area. Every interaction between the object, such as the second area and/or the bounding box, and the person, such as the first area and/or the body part segment, can update one or more usage parameters. This can be advantageous both for cleaning purposes and for finding unused/redundant objects.

The one or more usage parameters can include many types of interactions. For example, the one or more usage parameters can be indicative of a duration of the interaction between the object, such as the second area and/or the bounding box, and the person, such as the first area and/or the body part segment. one or more usage parameters may be indicative of the frequency of the interaction between the object, such as the second area and/or the bounding box, and the person, such as the first area and/or the body part segment. For example, if usage of a pen is repeatedly short and does not affect the surface of a whiteboard, the one or more usage parameters can indicate that the pen is non-functioning and needs replacement.

The one or more usage parameters may be indicative of an interaction between the object, such as the second area and/or the bounding box, and the person, such as the first area and/or the body part segment, that moves the object. For example, if a piece of furniture, such as a chair, is repeatedly moved out of way and immediately not used, the one or more usage parameters may indicate that it is either faulty or otherwise hindering an efficient workflow in the room.

The one or more usage parameters may be indicative of an interaction between the object, such as the second area and/or the bounding box, and the person, such as the first area and/or the body part segment, that changes the size of the object, such as the second area and/or the bounding box. For example, if a curtain is opened and/or closed, the size of the object may change, the one or more usage parameters could indicate that the curtain should be cleaned. For example, if interaction between a person, such as the first area and/or the body part segment, with an object, such as a switch, changes the size of the bounding box around the object, the one or more usage parameters can be indicative that the curtain control is functional.

The one or more usage parameters may be indicative of an interaction between the object, such as the second area and/or the bounding box, and the person, such as the first area and/or the body part segment, which affects another object. The another object can include a third area and/or a second bounding box.

In one or more example electronic devices, there may be association data indicative of a predetermined association between objects, such as between an interactor object and an interacted object. The association data may include an association parameter indicative of an action taken by the interacted object. Example association parameters include one or more of: an interaction with the interactor object, a change of size, a change of light intensity, and a change of location.

The processor circuitry 302 may be configured to determine an interaction parameter of the interacted object in accordance with a determination that the association parameter is indicative of an action taken by the interacted object. The processor circuitry 302 may be configured to not determine an interaction parameter of the interacted object in accordance with a determination that the association parameter is not indicative of an action taken by the interacted object.

As some of the objects, such as interacted objects, may not be directly interacted with by a person, such as a display and/or a curtain, it can be advantageous to still understand whether these objects are being used, and whether they need maintenance, such as by their association with an interactor object.

For example, an interactor object indicative of a whiteboard may have association data indicative of a predetermined association with an interacted object indicative of a whiteboard pen, for example an association parameter of an interaction with the interactor object. For example, an interactor object indicative of a remote may have association data indicative of a predetermined association with an interacted object indicative of a television and/or a display, for example an association parameter of a change of light intensity. For example, an interactor object indicative of a switch may have association data indicative of a predetermined association with an interacted object indicative of a curtain, for example an association parameter of change of size.

In one or more examples, interaction with an object, such as remote control, may change the light intensity of a second object, such as a television. The change of light intensity may be an association parameter between the remote control and the television. If the processor circuitry 302 does not detect a change in the second object, the processor circuitry 302 can be configured to generate a maintenance indicator indicative that the first object, such as the remote control, needs some sort of maintenance, such as a change of batteries.

In one or more example electronic devices, the electronic device can be configured to access an object database. In one or more example electronic devices, the object database can comprise a plurality of objects. In one or more example electronic devices, the object database can comprise a monitoring indicator associated with each of the plurality of objects. In one or more example electronic devices, the plurality of objects can include the object.

The object database can be programmed with and/or can include one or more objects.

The object database can be programmed with all objects that will be monitored by the electronic device 300. The object database can be updated with new objects. The object database can have an association of one or more status indicators with each of the objects. The object database can have an association of one or more maintenance indicators with each of the objects. The object database can have an association of one or more monitoring indicators with each of the objects.

Objects in the object database can be calibrated prior to monitoring. Objects in the object database can be calibrated during monitoring. Objects in the object database can be calibrated after monitoring.

In one or more example electronic devices, every object to be monitored by the electronic device 300 can be included in the object database. In one or more example electronic devices, some objects to be monitored by the electronic device 300 can be included in the object database.

In one or more example electronic devices, the maintenance indicator can be based at least partly on the monitoring indicator of the object. In one or more example electronic devices, the maintenance indicator can be based fully on the monitoring indicator of the object.

In one or more example electronic devices, the processor circuitry 302 can be configured to generate a surface characteristic indicator of the object. In one or more example electronic devices, the maintenance indicator can be based on the surface characteristic indicator. In one or more example electronic devices, the processor circuitry 302 can be configured to generate, based on the image data, a surface characteristic indicator of the object, and wherein the maintenance indicator can be based on the surface characteristic indicator.

The surface characteristic indicator can be indicative of a surface characteristic of the object. An example surface characteristic can be a light intensity level of an object, such as a lamp and/or a monitor and/or a television. The surface characteristic indicator can be indicative if the object is working properly.

Other example surface characteristic indicators may be indicative of what type of surface the object has. For example, whether the object is plastic, wood, metal, etc. This may be advantageous for how much cleaning needs to be performed for a wood object as compared to a metallic object.

In one or more example electronic devices, the maintenance indicator can be indicative of the object needing to be cleaned. In one or more example electronic devices, the maintenance indicator can be indicative of the object needing to be moved. In one or more example electronic devices, the maintenance indicator can be indicative of the object needing to be repaired. In one or more example electronic devices, the maintenance indicator can be indicative of the object needing to be cleaned, moved, replaced, and/or repaired.

In one or more example electronic devices, the determining of the interaction parameter comprises determining a distance between the first area and the second area. In one or more example electronic devices, the determining of the interaction parameter comprises determining whether the distance is below a distance threshold. In one or more example electronic devices, the processor circuitry 302 is configured to determine the status indicator in accordance with a determination that the distance is below the distance threshold. In one or more example electronic devices, the processor circuitry 302 is configured to not determine the status indicator (such as to forgo the determination of the status indicator) in accordance with a determination that the distance is not below the distance threshold.

The determining of the interaction parameter can include determining a distance between the first area and the second area. The determining of the interaction parameter can include determining a distance between the body part segment and the bounding box. The processor circuitry 302 can be configured to determine the status indicator in accordance with the distance being below a distance threshold. The processor circuitry 302 can be configured to determine the status indicator in accordance with the distance being below a distance threshold. In one or more example electronic devices, the processor circuitry 302 is configured to not determine the status indicator (such as to forgo the determination of the status indicator) in accordance with a determination that the distance is not below the distance threshold. In one or more example electronic devices, the electronic device 300 can be configured to detect human-object interaction by measuring the distance from the body part segment, to each object.

The distance threshold can be 0, 1, 2, 3, 4, 5, 6, 7, 8, 9, 10, 20, 30, 40, 50, or 60 centimetres. The distance threshold can be greater than 0, 1, 2, 3, 4, 5, 6, 7, 8, 9, 10, 20, 30, 40, 50, or 60 centimetres. The distance threshold can be less than 1, 2, 3, 4, 5, 6, 7, 8, 9, 10, 20, 30, 40, 50, or 60 centimetres.

The determining of the interaction parameter can include determining a contact between the first area and the second area. The determining of the interaction parameter can include determining a movement of one or more of: the first area and the second area.

The processor circuitry 302 can be configured to determine if the status indicator is above a distance threshold. The processor circuitry 302 can be configured to generate the maintenance indicator in accordance with the status indicator being above the distance threshold. The processor circuitry 302 can be configured to not generate the maintenance indicator in accordance with the status indicator not being above the distance threshold.

The processor circuitry 302 can be configured to determine if the status indicator is below a distance threshold. The processor circuitry 302 can be configured to generate the maintenance indicator in accordance with the status indicator being below the distance threshold. The processor circuitry 302 can be configured to not generate the maintenance indicator in accordance with the status indicator not being below the distance threshold.

In one or more example electronic devices, the processor circuitry 302 is configured to determine if the status indicator is above a threshold. In one or more example electronic devices, the processor circuitry 302 is configured to generate the maintenance indicator in accordance with the status indicator being above the threshold. In one or more example electronic devices, the processor circuitry 302 is configured to not generate the maintenance indicator in accordance with the status indicator not being above the threshold.

The threshold may set to a particular number of interactions. Each object may have an associated threshold. The threshold may be set to a duration of the interaction. The threshold may be set to a frequency of an interaction.

The threshold may be 1, 2, 3, 4, 5, 6, 7, 8, 9, 10, 20, 30, 40, 50, 60, 70, 80, 90, or 100 interactions. The threshold may be greater than 1, 2, 3, 4, 5, 6, 7, 8, 9, 10, 20, 30, 40, 50, 60, 70, 80, 90, or 100 interactions. The threshold may be less than 1, 2, 3, 4, 5, 6, 7, 8, 9, 10, 20, 30, 40, 50, 60, 70, 80, 90, or 100 interactions.

The threshold may be an interaction duration of 1, 2, 3, 4, 5, 6, 7, 8, 9, 10, 20, 30, 40, 50, 60 seconds. The threshold may be an interaction duration of less than 1, 2, 3, 4, 5, 6, 7, 8, 9, 10, 20, 30, 40, 50, 60 seconds. The threshold may be an interaction duration of greater than 1, 2, 3, 4, 5, 6, 7, 8, 9, 10, 20, 30, 40, 50, 60 seconds.

The threshold may be an interaction duration of 1, 2, 3, 4, 5, 6, 7, 8, 9, 10, 20, 30, 40, 50, 60 minutes. The threshold may be an interaction duration of less than 1, 2, 3, 4, 5, 6, 7, 8, 9, 10, 20, 30, 40, 50, 60 minutes. The threshold may be an interaction duration of greater than 1, 2, 3, 4, 5, 6, 7, 8, 9, 10, 20, 30, 40, 50, 60 minutes.

The threshold may be an interaction frequency of 1, 2, 3, 4, 5, 6, 7, 8, 9, or 10 interactions per hour. The threshold may be an interaction frequency of greater than 1, 2, 3, 4, 5, 6, 7, 8, 9, or 10 interactions per hour. The threshold may be an interaction frequency of less than 1, 2, 3, 4, 5, 6, 7, 8, 9, or 10 interactions per hour.

In one or more example electronic devices, the processor circuitry 302 can be configured to determine if the status indicator is below a threshold (which may be denoted as a second threshold). In one or more examples, the processor circuitry 302 can be configured to generate the maintenance indicator in accordance with the status indicator being below the threshold. In one or more example electronic devices, the processor circuitry 302 is configured to not generate the maintenance indicator in accordance with the status indicator not being below the threshold.

The threshold may set to a particular number of interactions. Each object may have an associated threshold. The threshold may be set to a duration of the interaction. The threshold may be set to a frequency of an interaction.

The threshold may be 1, 2, 3, 4, 5, 6, 7, 8, 9, 10, 20, 30, 40, 50, 60, 70, 80, 90, or 100 interactions. The threshold may be greater than 1, 2, 3, 4, 5, 6, 7, 8, 9, 10, 20, 30, 40, 50, 60, 70, 80, 90, or 100 interactions. The threshold may be less than 1, 2, 3, 4, 5, 6, 7, 8, 9, 10, 20, 30, 40, 50, 60, 70, 80, 90, or 100 interactions.

The threshold may be an interaction duration of 1, 2, 3, 4, 5, 6, 7, 8, 9, 10, 20, 30, 40, 50, 60 seconds. The threshold may be an interaction duration of less than 1, 2, 3, 4, 5, 6, 7, 8, 9, 10, 20, 30, 40, 50, 60 seconds. The threshold may be an interaction duration of greater than 1, 2, 3, 4, 5, 6, 7, 8, 9, 10, 20, 30, 40, 50, 60 seconds.

The threshold may be an interaction duration of 1, 2, 3, 4, 5, 6, 7, 8, 9, 10, 20, 30, 40, 50, 60 minutes. The threshold may be an interaction duration of less than 1, 2, 3, 4, 5, 6, 7, 8, 9, 10, 20, 30, 40, 50, 60 minutes. The threshold may be an interaction duration of greater than 1, 2, 3, 4, 5, 6, 7, 8, 9, 10, 20, 30, 40, 50, 60 minutes.

The threshold may be an interaction frequency of 1, 2, 3, 4, 5, 6, 7, 8, 9, or 10 interactions per hour. The threshold may be an interaction frequency of greater than 1, 2, 3, 4, 5, 6, 7, 8, 9, or 10 interactions per hour. The threshold may be an interaction frequency of less than 1, 2, 3, 4, 5, 6, 7, 8, 9, or 10 interactions per hour.

In one or more examples, the threshold and the second threshold are different, such as for different monitoring different objects. In one or more examples, the threshold and the second threshold are the same.

In one or more example electronic devices, the outputting of the maintenance indicator includes outputting the maintenance indicator to a server.

The outputting of the maintenance indicator can include outputting the maintenance indicator to a server. The outputting of the maintenance indicator can include outputting the maintenance indicator to a cloud server. The outputting of the maintenance indicator can include outputting the maintenance indicator to a user device. The user device can be, for example, one or more of: a computer, a cellular phone, a tablet, a smartphone, a laptop, a monitor, a screen, an augmented reality device, augmented reality glasses, a beeper, and a projector.

In one or more example electronic devices, the outputting of the maintenance indicator can include outputting the maintenance indicator for an illumination of the object. In one or more example electronic devices, the outputting of the maintenance indicator can include outputting the maintenance indicator for an illumination of the object via a projector. In one or more example electronic devices, the outputting of the maintenance indicator can include outputting the maintenance indicator for viewing a maintenance signal indicative of the maintenance indicator.

For example, a room being monitored by the electronic device 300 may include a projector, such as a light and/or a spotlight and/or an image projector. Once a maintenance indicator is generated, the projector may light up the object that the maintenance indicator is indicative of.

For example, the projector may project a particular light for each operation. The projector may project a red light on an object indicative that repair needs to be performed. The projector may project a green light on an object indicative that the object needs to be cleaned. This may also be an indicator for a person who is not cleaning the object to stay away. The projector may project a blue light on an object indicative that the object needs to be moved or removed. For example, the projector light may be a suggestion for a new room layout because the object keeps being moved. The projector may project the same light on all objects.

The outputting of the maintenance indicator can include outputting the maintenance indicator for viewing a maintenance signal indicative of the maintenance indicator on an augmented reality device. The outputting of the maintenance indicator can include outputting the maintenance indicator for an illumination of the object via a projector and/or for viewing a maintenance signal indicative of the maintenance indicator on an augmented reality device. The augmented reality device can be, for example, augmented reality capable glasses and/or an augmented reality capable tablet and/or an augmented reality capable phone.

For example, the augmented reality device may indicate a particular light, or marker, for each operation. The augmented reality device may indicate a red light, or repair marker, on an object indicative that repair needs to be performed. The augmented reality device may indicate a green light, or cleaning marker, on an object indicative that the object needs to be cleaned. The augmented reality device may indicate a blue light, or movement/removal marker, on an object indicative that the object needs to be moved or removed. For example, the augmented reality device may be a suggestion for a new room layout because the object keeps being moved.

Figure 2A:
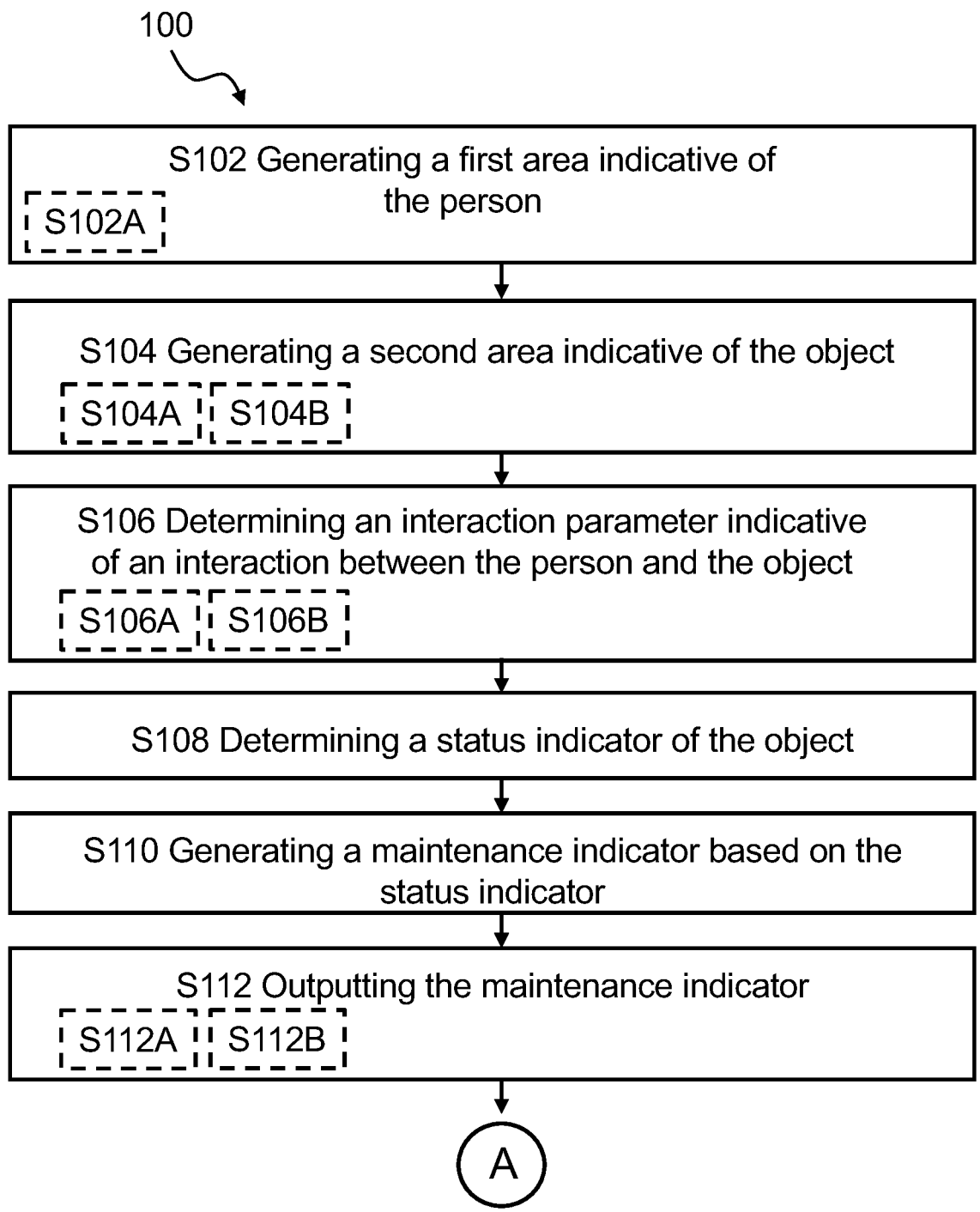
FIGS. 2A-2B are flow-charts illustrating an example method, performed in an electronic device, for monitoring an object according to this disclosure.
Figure 2B:
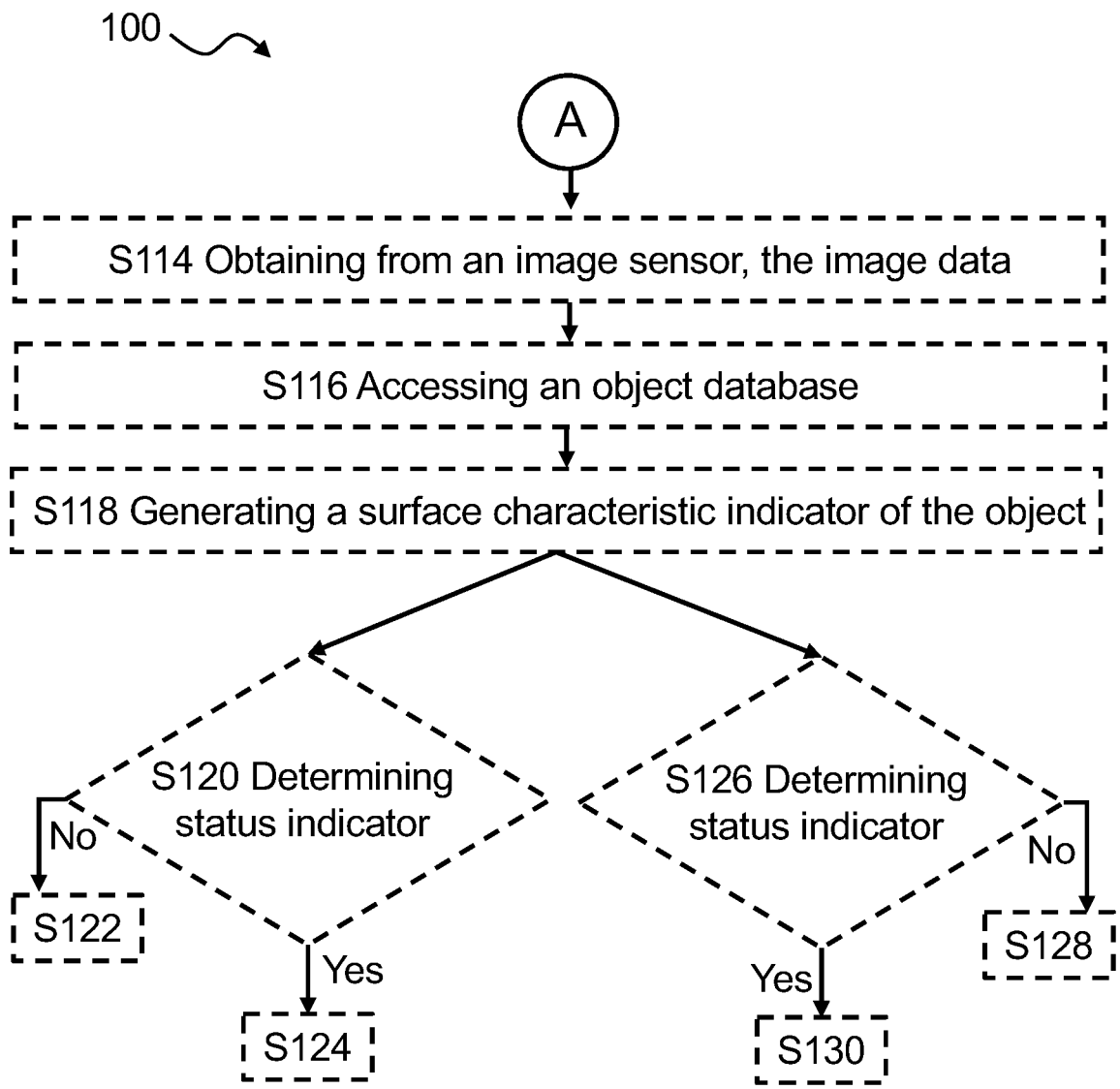

The electronic device 300 is optionally configured to perform any of the operations disclosed in FIGS. 2A-2B (such as any one or more of S102, S102A, S104, S104A, S104B, S106, S106A, S106B, S108, S110, S112, S112A, S112B, S114, S116, S118, S120, S122, S124, S126, S128). In other words, the electronic device 300 may be configured to monitor an object. The operations of the electronic device 300 may be embodied in the form of executable logic routines (for example, lines of code, software programs, etc.) that are stored on a non-transitory computer readable medium (for example, memory circuitry 301 and are executed by processor circuitry 302.

Furthermore, the operations of the electronic device 300 may be considered a method that the electronic device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302.

Memory circuitry 301 may exchange data with processor circuitry 302 over a data bus. Control lines and an address bus between memory circuitry 301 and processor circuitry 302 also may be present (not shown in FIG. 1). Memory circuitry 301 is considered a non-transitory computer readable medium.

Memory circuitry 301 may be configured to store information such as a image data, status indicator, and/or maintenance indicator in a part of the memory.

FIGS. 2A-2B show flow diagrams of an example method 100 performed by an electronic device of the disclosure for monitoring an object. For example, the electronic device 300 of FIG. 1, or any other electronic device of the disclosure, can perform the method 100.

The method 100 can be performed by an electronic device to monitor an object. In one or more example methods, method 100 can include generating S102, based on image data including one or more frames indicative of a person and/or the object, a first area indicative of the person. In one or more example methods, method 100 can include generating S104, based on the image data, a second area indicative of the object. In one or more example methods, method 100 can include determining S106, based on the first area and the second area, an interaction parameter indicative of an interaction between the person and the object. In one or more example methods, method 100 can include determining S108, based on the interaction parameter, a status indicator of the object. In one or more example methods, method 100 can include generating S110 a maintenance indicator based on the status indicator. In one or more example methods, method 100 can include outputting S112 the maintenance indicator.

In one or more example methods, the method 100 can include obtaining S114, from an image sensor, the image data.

In one or more example methods, the generating S102 of the first area can include applying S102A a pose detection scheme to the one or more frames of the image data.

In one or more example methods, the generating S104 of the second area can include applying S104A an object extraction scheme to the one or more frames of the image data.

In one or more example methods, generating S104 of the second area can include generating S104B, based on the object extraction scheme, a bounding box indicative of the first area.

In one or more example methods, the status indicator can include one or more usage parameters can include a duration of the interaction and/or a frequency of the interaction and/or a movement of the object and/or a change of size of the second area and/or an effect by the object on another object.

In one or more example methods, the electronic device can include an image sensor internal to the electronic device and/or external to the electronic device.

In one or more example methods, the method 100 can include accessing S116 an object database, the object database can include a plurality of objects and a monitoring indicator associated with each of the plurality of objects, wherein the plurality of objects can include the object.

In one or more example methods, the maintenance indicator is based at least partly on the monitoring indicator of the object.

In one or more example methods, the method 100 can include generating S118, based on the image data, a surface characteristic indicator of the object, and wherein the maintenance indicator is based on the surface characteristic indicator.

In one or more example methods, the maintenance indicator can be indicative of the object needing to be cleaned, moved, replaced, and/or repaired.

In one or more example methods, the determining S106 of the interaction parameter can include determining S106A a distance between the first area and the second area. In one or more example methods, the determining of the interaction parameter comprises determining whether the distance is below a distance threshold. In one or more example methods, the method 100 can include determining S106B the status indicator in accordance with the distance being below the distance threshold. In one or more example method, the method 100 comprises not determining the status indicator (such as to forgo the determination of the status indicator) in accordance with a determination that the distance is not below the distance threshold.

In one or more example methods, the method 100 can include determining S120 if the status indicator is above a threshold. In one or more example methods, the method 100 can include generating S124 the maintenance indicator in accordance with the status indicator being above the threshold. The method 100 may comprise not generating S122 the maintenance indicator in accordance with the status indicator not being above the threshold.

The method 100 can include determining S126 if the status indicator is below a threshold. In one or more example methods, method 100 can include generating S130 the maintenance indicator in accordance with the status indicator being below the threshold. In one or more example methods, method 100 may include not generating S128 the maintenance indicator in accordance with the status indicator not being below the threshold.

In one or more example methods, the outputting S112 of the maintenance indicator can include outputting S112A the maintenance indicator to a server.

In one or more example methods, the outputting S112 of the maintenance indicator can include outputting S112B the maintenance indicator for an illumination of the object via a projector and/or for viewing a maintenance signal indicative of the maintenance indicator on an augmented reality device.

Figure 3:
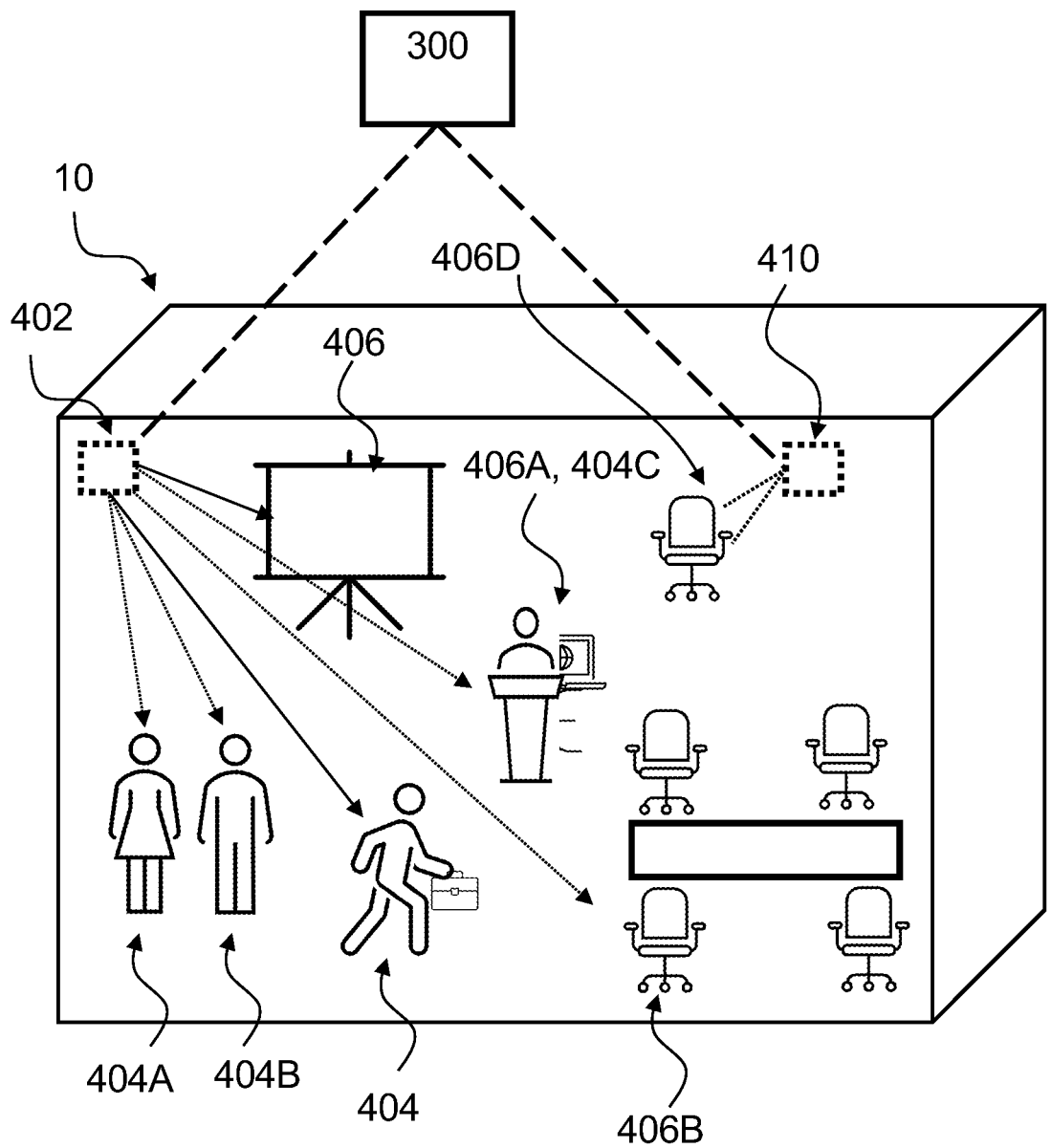
FIG. 3 is an schematic diagram of an example electronic device configured to monitor an object according to the disclosure.

FIG. 3 illustrates a schematic diagram of a meeting room 10 which can be monitored by an example electronic device of the disclosure. For example, the meeting room 10 can be monitored by electronic device 300, discussed with respect to FIG. 1.

As shown, the electronic device 300 can receive image data from an image sensor 402, which may or may not be part of the electronic device 300. The image sensor 402 can capture one or more frames indicative of a person 404 and/or an object 406. Optionally, the electronic device 300 may be a server device configured to communicate with devices, such as image sensor 402, located in the meeting room 10. The image sensor 402 may act as the electronic device disclosed herein in one or more examples.

The electronic device 300 can optionally monitor further persons 404A/404B/404C and further objects 406A/406B.

The electronic device 300 can generate first areas and second areas indicative of the person 404 and object 406, respectively. The electronic device 300 can generate further areas indicative of the further persons 404A/404B/404C and objects 406A/406B.

The electronic device 300 can be configured to apply a pose detection scheme, such as on person 406A in order to determine an interaction between the person 406A and the object 404C, even with the occlusion as shown in FIG. 3.

Further, the electronic device 300 can be optionally configured to output a maintenance indicator for illumination of an object, such as via projector 410. For example, if an object 406D has been moved and has not been interacted with, the projector 410 may illuminate the object 406D with a light indicative that the object 406D should be removed.

Examples of methods and products (electronic devices) according to the disclosure are set out in the following items:

Item 1. An electronic device configured to monitor an object, the electronic device comprising:
- memory circuitry;
- interface circuitry; and
- processor circuitry, wherein the processor circuitry is configured to:
  - generate, based on image data comprising one or more frames indicative of a person and/or the object, a first area indicative of the person;
  - generate, based on the image data, a second area indicative of the object;
  - determine, based on the first area and the second area, an interaction parameter indicative of an interaction between the person and the object;
  - determine, based on the interaction parameter, a status indicator of the object;
  - generate a maintenance indicator based on the status indicator; and
  - output the maintenance indicator.

Item 2. The electronic device of Item 1, wherein the electronic device is configured to obtain, from an image sensor, the image data.

Item 3. The electronic device of any one of Items 1-2, wherein the generation of the first area comprises applying a pose detection scheme to the one or more frames of the image data.

Item 4. The electronic device of any one of Items 1-3, wherein the generation of the second area comprises applying an object extraction scheme to the one or more frames of the image data.

Item 5. The electronic device of Item 4, wherein the generation of the second area comprises generating, based on the object extraction scheme, a bounding box indicative of the first area.

Item 6. The electronic device of any one of Items 1-5, wherein the status indicator comprises one or more usage parameters comprising a duration of the interaction and/or a frequency of the interaction and/or a movement of the object and/or a change of size of the second area and/or an effect by the object on another object.

Item 7. The electronic device of any of Items 1-6, wherein the electronic device comprises an image sensor internal to the electronic device and/or external to the electronic device.

Item 8. The electronic device of any one of Items 1-7, wherein the electronic device is configured to access an object database, the object database comprising a plurality of objects and a monitoring indicator associated with each of the plurality of objects, wherein the plurality of objects comprises the object.

Item 9. The electronic device of Item 8, wherein the maintenance indicator is based at least partly on the monitoring indicator of the object.

Item 10. The electronic device of any one of Items 1-9, wherein the processor circuitry is configured to generate, based on the image data, a surface characteristic indicator of the object, and wherein the maintenance indicator is based on the surface characteristic indicator.

Item 11. The electronic device of any one of Items 1-10, wherein the maintenance indicator is indicative of the object needing to be cleaned, moved, replaced, and/or repaired.

Item 12. The electronic device of any one of Items 1-11, wherein the determining of the interaction parameter comprises determining a distance between the first area and the second area, and in accordance with the distance being below a distance threshold, the processor circuitry is configured to determine the status indicator.

Item 13. The electronic device of any one of Items 1-12, wherein the processor circuitry is configured to determine if the status indicator is above a threshold and, in accordance with the status indicator being above the threshold, the processor circuitry is configured to generate the maintenance indicator.

Item 14. The electronic device of any one of Items 1-12, wherein the processor circuitry is configured to determine if the status indicator is below a threshold and, in accordance with the status indicator being below the threshold, the processor circuitry is configured to generate the maintenance indicator.

Item 15. The electronic device of any one of Items 1-14, wherein the outputting of the maintenance indicator comprises outputting the maintenance indicator to a server.

Item 16. The electronic device of any one of Items 1-15, wherein the outputting of the maintenance indicator comprises outputting the maintenance indicator for an illumination of the object via a projector and/or for viewing a maintenance signal indicative of the maintenance indicator on an augmented reality device.

Item 17. A method, performed by an electronic device to monitor an object, the method comprising:
- generating (S102), based on image data comprising one or more frames indicative of a person and/or the object, a first area indicative of the person;
- generating (S104), based on the image data, a second area indicative of the object;
- determining (S106), based on the first area and the second area, an interaction parameter indicative of an interaction between the person and the object;
- determining (S108), based on the interaction parameter, a status indicator of the object;
- generating (S110) a maintenance indicator based on the status indicator; and
- outputting (S112) the maintenance indicator.

Item 18. The method of Item 17, the method comprising obtaining (S114), from an image sensor, the image data.

Item 19. The method of any one of Items 17-18, wherein the generating (S102) of the first area comprises applying (S102A) a pose detection scheme to the one or more frames of the image data.

Item 20. The method of any one of Items 17-19, wherein the generating (S104) of the second area comprises applying (S104A) an object extraction scheme to the one or more frames of the image data.

Item 21. The method of Item 20, wherein the generating (S104) of the second area comprises generating (S104B), based on the object extraction scheme, a bounding box indicative of the first area.

Item 22. The method of any one of Items 17-21, wherein the status indicator comprises one or more usage parameters comprising a duration of the interaction and/or a frequency of the interaction and/or a movement of the object and/or a change of size of the second area and/or an effect by the object on another object.

Item 23. The method of any one of Items 17-22, wherein the electronic device comprises an image sensor internal to the electronic device and/or external to the electronic device.

Item 24. The method of any one of Items 17-23, the method comprising accessing (S116) an object database, the object database comprising a plurality of objects and a monitoring indicator associated with each of the plurality of objects, wherein the plurality of objects comprises the object.

Item 25. The method of Item 24, wherein the maintenance indicator is based at least partly on the monitoring indicator of the object.

Item 26. The method of any one of Items 17-25, the method comprising generating (S118), based on the image data, a surface characteristic indicator of the object, and wherein the maintenance indicator is based on the surface characteristic indicator.

Item 27. The method of any one of Items 17-26, wherein the maintenance indicator is indicative of the object needing to be cleaned, moved, replaced, and/or repaired.

Item 28. The method of any one of Items 17-27, wherein the determining (S106) of the interaction parameter comprises determining (S106A) a distance between the first area and the second area, and in accordance with the distance being below a distance threshold, the method comprises determining (S106B) the status indicator.

Item 29. The method of any one of Items 17-28, the method comprising determining (S120) if the status indicator is above a threshold and, in accordance with the status indicator being above the threshold, the method comprises generating (S124) the maintenance indicator.

Item 30. The method of any one of Items 17-28, the method comprising determining (S126) if the status indicator is below a threshold and, in accordance with the status indicator being below the threshold, the method comprises generating (S130) the maintenance indicator.

Item 31. The method of any one of Items 17-30, wherein the outputting (S112) of the maintenance indicator comprises outputting (S112A) the maintenance indicator to a server.

Item 32. The method of any one of Items 17-31, wherein the outputting (S112) of the maintenance indicator comprises outputting (S112B) the maintenance indicator for an illumination of the object via a projector and/or for viewing a maintenance signal indicative of the maintenance indicator on an augmented reality device.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-3 comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. An electronic device configured to monitor an object, the electronic device comprising:
   memory circuitry comprising association data indicative of a predetermined association between an interactor object and an interacted object;
   interface circuitry; and
   processor circuitry, wherein the processor circuitry is configured to:
      generate, based on image data comprising one or more frames indicative of a person and/or the interactor object, a first area indicative of the person;
      generate, based on the image data, a second area indicative of the interactor object;
      determine, based on the first area, the second area, and the association data, an interaction parameter indicative of an indirect interaction between the person and the interacted object, wherein the interacted object is not directly interacted with by the person;

determine, based on the interaction parameter, a status indicator of the interacted object;

generate a maintenance indicator based on the status indicator; and output the maintenance indicator.

2. The electronic device of claim 1, wherein the electronic device is configured to obtain, from an image sensor, the image data.

3. The electronic device of claim 1, wherein the generation of the first area comprises applying a pose detection scheme to the one or more frames of the image data.

4. The electronic device of claim 1, wherein the generation of the second area comprises applying an object extraction scheme to the one or more frames of the image data.

5. The electronic device of claim 4, wherein the generation of the second area comprises generating, based on the object extraction scheme, a bounding box indicative of the first area.

6. The electronic device of claim 1, wherein the status indicator comprises one or more usage parameters comprising a duration of the interaction and/or a frequency of the interaction and/or a movement of the object and/or a change of size of the second area and/or an effect by the object on another object.

7. The electronic device of claim 1, wherein the electronic device comprises an image sensor internal to the electronic device and/or external to the electronic device.

8. The electronic device of claim 1, wherein the electronic device is configured to access an object database, the object database comprising a plurality of objects and a monitoring indicator associated with each of the plurality of objects, wherein the plurality of objects comprises the object.

9. The electronic device of claim 8, wherein the maintenance indicator is based at least partly on the monitoring indicator of the object.

10. The electronic device of claim 1, wherein the processor circuitry is configured to generate, based on the image data, a surface characteristic indicator of the object, and wherein the maintenance indicator is based on the surface characteristic indicator.

11. The electronic device of claim 1, wherein the maintenance indicator is indicative of the object needing to be cleaned, moved, replaced, and/or repaired.

12. The electronic device of claim 1, wherein the determining of the interaction parameter comprises determining a distance between the first area and the second area, and in accordance with the distance being below a distance threshold, the processor circuitry is configured to determine the status indicator.

13. The electronic device of claim 1, wherein the processor circuitry is configured to determine if the status indicator is above a threshold and, in accordance with the status indicator being above the threshold, the processor circuitry is configured to generate the maintenance indicator.

14. The electronic device of claim 1, wherein the processor circuitry is configured to determine if the status indicator is below a threshold and, in accordance with the status indicator being below the threshold, the processor circuitry is configured to generate the maintenance indicator.

15. The electronic device of claim 1, wherein the outputting of the maintenance indicator comprises outputting the maintenance indicator to a server.

16. The electronic device of claim 1, wherein the outputting of the maintenance indicator comprises outputting the maintenance indicator for an illumination of the object via a projector and/or for viewing a maintenance signal indicative of the maintenance indicator on an augmented reality device.

17. A method, performed by an electronic device to monitor an interacted object, the method comprising:

generating, based on image data comprising one or more frames indicative of a person and/or an interactor object associated with the interacted object by association data, a first area indicative of the person;

generating, based on the image data, a second area indicative of the interactor object;

determining, based on the first area, the second area, and the association data, an interaction parameter indicative of an indirect interaction between the person and the interacted object, wherein the interacted object is not directly interacted with by the person;

determining, based on the interaction parameter, a status indicator of the interacted object;

generating a maintenance indicator based on the status indicator; and outputting the maintenance indicator.

18. The method of claim 17, the method comprising obtaining, from an image sensor, the image data.

19. The method of claim 17, wherein the generating of the first area comprises applying a pose detection scheme to the one or more frames of the image data.

20. The method of claim 17, wherein the generating of the second area comprises applying an object extraction scheme to the one or more frames of the image data.

* * * * *